Dec. 28, 1926.  
F. A. MIRANDE  
TIRE CARRIER  
Filed July 31, 1923  
1,612,523
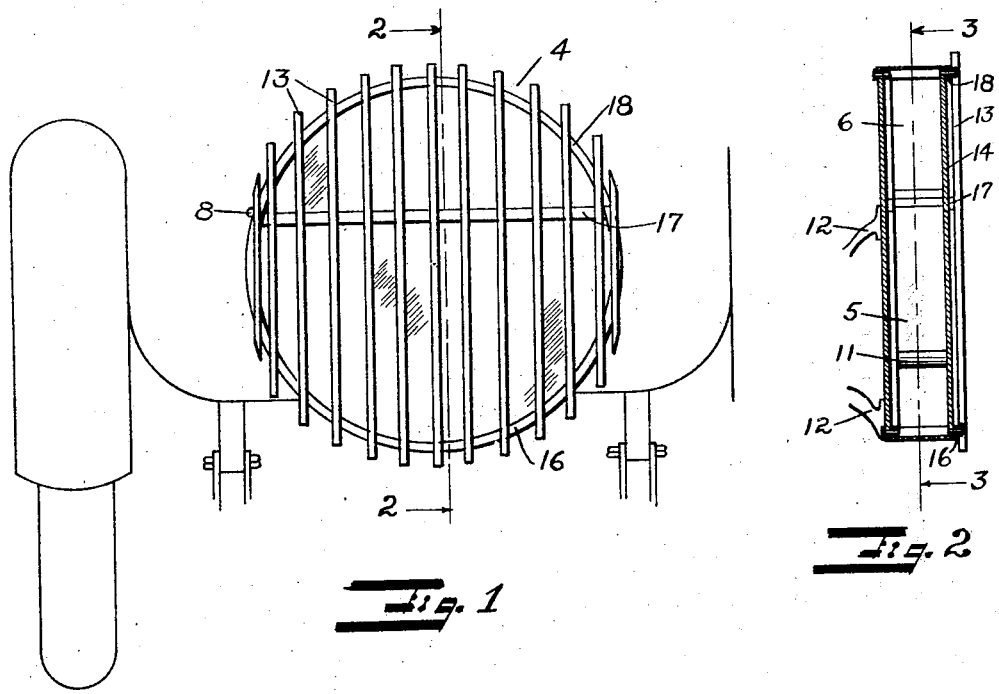
Fig. 1  
Fig. 2
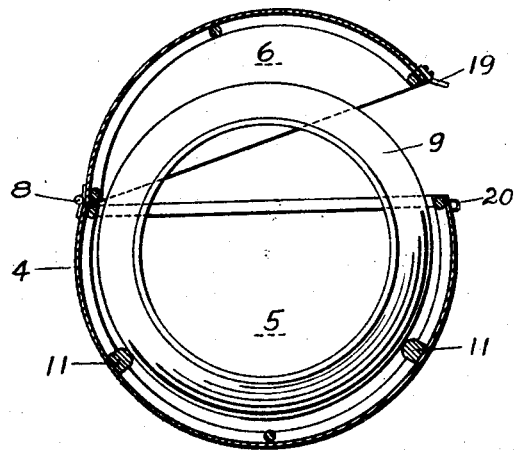
Fig. 3
INVENTOR.  
FRANK A. MIRANDE.  
BY Joseph B. Gardner  
ATTORNEY Patented Dec. 28, 1926.

1,612,523

UNITED STATES PATENT OFFICE.

FRANK A. MIRANDE, OF SAN LEANDRO, CALIFORNIA.

TIRE CARRIER.

Application filed July 31, 1923. Serial No. 654,880.

My invention relates to a spare tire case arranged to be carried at a side of an automobile.

An object of the invention is to provide a device of the character described which will effectively support the tire and at the same time protect the automobile as well as the tire from damage.

Another object of the invention is to provide a tire carrier from which the tire may be removed or in which the tire may be inserted when luggage is held against it.

My invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a rear view of a portion of an automobile equipped with the tire carrier of my invention.

Figure 2 is a vertical section of the carrier taken on the line 2—2 in Figure 1.

Figure 3 is a vertical section of the carrier taken on the line 3—3 in Figure 3, showing the closure section partly open.

Briefly expressed, the carrier of my invention in its present embodiment comprises a receptacle having a body portion which is adapted to be rigidly fixed to the automobile at the rear thereof and a closure portion which is hinged to the body portion in such manner as to enable the edgewise withdrawal or insertion of the tire. Fixed to the body and arranged thereon upon the side more remote from the adjacent side of the automobile are a plurality of vertical spaced bars adapted to cover both of the sections and serve as a guard for the rear of the automobile as well as for the carrier.

A detailed description follows:—

As illustrated in the drawings, the carrier is adapted to be positioned at the rear side of an automobile and comprises a receptacle 4, here shown composed of a body section 5 and a closure section 6. The receptacle is preferably cylindrical in form to accommodate a spare tire or wheel, and the sections 5 and 6 are in the form of segments. The sections are preferably connected by a hinge 8 so that the section 6 may be readily swung to permit the insertion or withdrawal of a tire 9 into or out of the receptacle. The section 5 is preferably larger than the section 6 in order that the major portion of the tire may rest therein. The tire preferably rests on appropriately located supports 11 provided in the side wall of section 5 and between which the tire is adapted to slightly wedge. The receptacle may be attached to the automobile in any suitable manner. As here shown, said attachment may be effected by means of brackets 12 fixed to the body section 5 and extending forwardly therefrom for attachment to the frame or body of the automobile.

Arranged on the rear side of the receptacle and securely fixed to the body section 5 are a plurality of vertical spaced guard bars 13 which are adapted to extend beyond the edges of both sections when the receptacle is closed. The bars are preferably held spaced from the rear wall 14 of the receptacle by means of a ring segment 16 and chord bar 17 fixed on section 5. A complementary ring segment 18 is preferably arranged on the segment 6. It will thus be noted that the receptacle and contents are effectively protected from collisions and impacts. It will also be noted that the rear of the automobile is protected from injury.

While I have here shown the guard structure in the form of vertical bars, it is obvious that this construction may be varied and the structure made different without departing from the spirit of the invention.

My device also particularly lends itself to association with the usual type of luggage carrier positioned at the rear of an automobile, since the receptacle here shown permits the edgewise removal or insertion of the tire, and the guard bars keep the luggage from interfering with the opening or closing of the section 6.

If desired, the sections may be locked together in closed relation by suitable means such as the hasp 19 and staple 20 positioned at abutting edges of the sections and held together by a padlock or the like.

I claim:

1. In a device of the character described, means adapted to be attached as a unit to an automobile at a side thereof for carrying a tire and including a plurality of spaced parallel bars arranged to guard the tire at the side more remote from said side of the automobile.

2. In a device of the character described, means adapted to be fixed as a unit to an automobile at a side thereof and comprising a tire receptacle, and a plurality of spaced parallel bars fixed to said receptacle and covering the side thereof more remote from said side of the automobile.

3. In a device of the character described, a tire receptacle adapted to be fixed to a side of an automobile and a plurality of spaced bars fixed on the side of the receptacle more remote from said side of the automobile and extended beyond the edges of the receptacle.

4. A tire receptacle including a body section adapted to be fixedly attached to an automobile at a side thereof, a displaceable closure section hingedly connected to said body section, and a plurality of spaced guard bars carried by said body section and arranged on the side thereof more remote from said side of the automobile adapted to cover said side of said body and the contiguous side of said displaceable section.

5. In a device of the character described, a tire receptacle adapted to be secured to an automobile at a side and having an opening to permit the insertion of a tire into the receptacle or the withdrawal of a tire therefrom edgewise of the receptacle, a closure member for said opening, and a guard secured to said receptacle and arranged across said receptacle and said closure member.

In testimony whereof, I have hereunto set my hand at Oakland, this 10th day of July, 1923.

FRANK A. MIRANDE.